US010816952B2

(12) United States Patent
Miyata

(10) Patent No.: US 10,816,952 B2
(45) Date of Patent: Oct. 27, 2020

(54) CONTROL METHOD FOR PROCESSING APPARATUS

(71) Applicant: DISCO CORPORATION, Tokyo (JP)

(72) Inventor: Satoshi Miyata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/287,560

(22) Filed: Feb. 27, 2019

(65) Prior Publication Data

US 2019/0271962 A1 Sep. 5, 2019

(30) Foreign Application Priority Data

Mar. 2, 2018 (JP) ................................. 2018-037255

(51) Int. Cl.
| | |
|---|---|
| *G05B 19/402* | (2006.01) |
| *G06F 3/0488* | (2013.01) |
| *G06F 3/0484* | (2013.01) |
| *G06T 7/00* | (2017.01) |
| *G05B 19/418* | (2006.01) |

(52) U.S. Cl.
CPC ..... *G05B 19/402* (2013.01); *G05B 19/41875* (2013.01); *G06F 3/0488* (2013.01); *G06F 3/04847* (2013.01); *G06T 7/0004* (2013.01); *G05B 2219/32073* (2013.01); *G05B 2219/32186* (2013.01); *G05B 2219/36168* (2013.01); *G05B 2219/50122* (2013.01); *G06T 2207/20092* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 2005/0190361 | A1* | 9/2005 | Ishiba | G01N 21/95684 356/237.2 |
| 2014/0098091 | A1* | 4/2014 | Hori | G06T 7/62 345/419 |
| 2014/0126804 | A1* | 5/2014 | Ding | G01N 21/8806 382/141 |
| 2014/0337780 | A1* | 11/2014 | Northrup | G06F 3/04847 715/771 |
| 2015/0022638 | A1* | 1/2015 | Saeki | G06T 7/521 348/46 |

FOREIGN PATENT DOCUMENTS

JP 2001298000 A 10/2001

* cited by examiner

*Primary Examiner* — Ryan A Jarrett
(74) *Attorney, Agent, or Firm* — Greer Burns & Crain, Ltd.

(57) ABSTRACT

A control method for a processing apparatus includes the steps of suspending a processing operation of a processing unit during the formation of a processed groove and then imaging the processed groove by using an imaging unit to obtain a detected image, inspecting the condition of the processed groove according to the detected image, inputting a selected one of plural parameters into an input area displayed on a touch panel from an operator in adjusting the parameters to optimize inspection conditions, moving an input cursor from the input area according to the input of the selected parameter, and executing the inspection of the processed groove by using the selected parameter input in the input area.

17 Claims, 5 Drawing Sheets

CONTROL METHOD FOR PROCESSING APPARATUS

BACKGROUND OF THE INVENTION

Field of the Invention

The present invention relates to a control method for a processing apparatus for processing a workpiece.

Description of the Related Art

In dividing a workpiece such as a semiconductor wafer and a package substrate into a plurality of chips, a processing apparatus such as a cutting apparatus and a laser processing apparatus is used. Known is such a processing apparatus having a configuration for imaging a processed groove formed on the workpiece to obtain a detected image and then inspecting any processing defects from this detected image (see Japanese Patent Laid-Open No. 2001-298000, for example). In the processing apparatus described in this publication, the processing defects including chipping, meandering, and processing position shift are automatically inspected (kerf inspection) according to the detected image of the processed groove imaged by imaging means. As the result of this inspection, any measures against the processing defects are taken. For example, these measures include correction of the processing position, suspension of the processing, and alarming to an operator.

SUMMARY OF THE INVENTION

The processed groove is inspected by setting various parameters including a light quantity of the imaging means on a setting screen of a touch panel and then touching an OK button displayed on the touch panel. However, any optimum inspection conditions change according to a surface condition of the workpiece, for example. Accordingly, the parameters need to be repeatedly set, so as to find out an optimum parameter for the inspection of the processed groove. As a result, every time the parameters of the imaging means are repeatedly input, the OK button is touched to perform the inspection of the processed groove. That is, the operation of selecting the inspection conditions is troublesome, and much time is required for the optimization of the inspection conditions.

It is therefore an object of the present invention to provide a control method for a processing apparatus which can facilitate the operation of selecting the parameter for the inspection conditions.

In accordance with an aspect of the present invention, there is provided a control method for a processing apparatus including a chuck table for holding a workpiece, a processing unit for forming a processed groove on the workpiece held on the chuck table, imaging means for detecting a target area of the workpiece to be processed, and a touch panel for displaying an image detected by the imaging means, the touch panel being capable of receiving an input of a plurality of parameters for various inspection conditions, the control method including the steps of suspending a processing operation of the processing unit during the formation of the processed groove and then imaging the processed groove by using the imaging means to obtain the detected image; inspecting the condition of the processed groove according to the detected image; inputting a selected one of the parameters into an input area displayed on the touch panel from an operator in adjusting the parameters to optimize the inspection conditions; moving an input cursor from the input area according to the input of the selected parameter; and executing the inspection of the processed groove by using the selected parameter input in the input area.

With this configuration, the following effects can be exhibited. When the parameter is input into the input area and the input cursor is moved from the input area, the inspection for the processed groove is triggered. That is, the inspection for the processed groove is automatically started without the need for instruction from the operator. That is, it is unnecessary for the operator to instruct the inspection every time the parameter is input. Accordingly, the operation of selecting the parameter for the inspection conditions can be smoothly performed and the inspection conditions can be optimized in a short time.

Preferably, the plurality of parameters include a light quantity. Preferably, the plurality of parameters include an imaging position.

As described above, when the parameter is input into the input area and the input cursor is moved from the input area, the inspection for the processed groove is triggered. Accordingly, the operation of selecting the parameter for the inspection conditions can be smoothly performed.

The above and other objects, features, and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
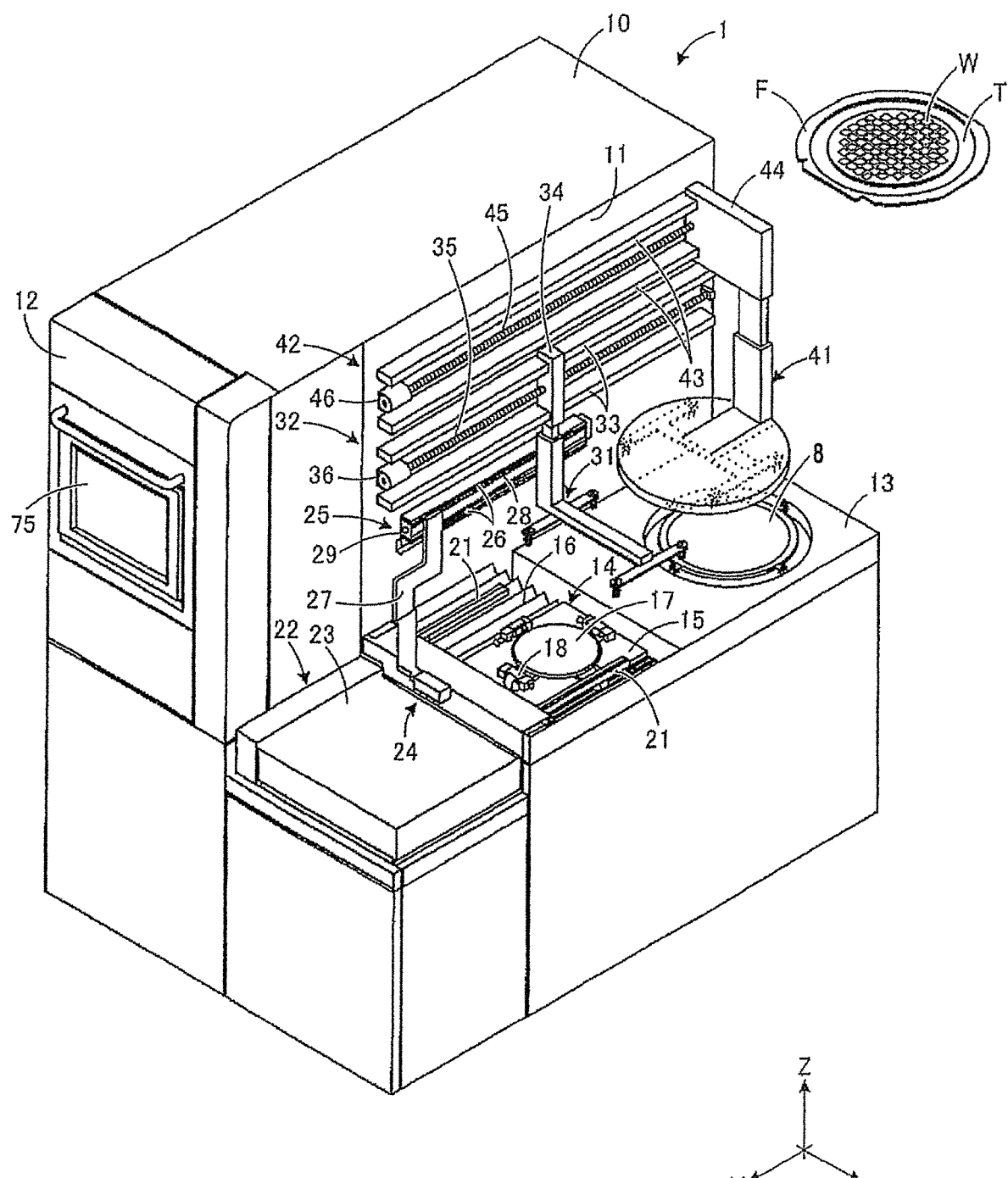
FIG. 1 is a perspective view depicting an outward appearance of a cutting apparatus according to a preferred embodiment of the present invention.
Figure 2:
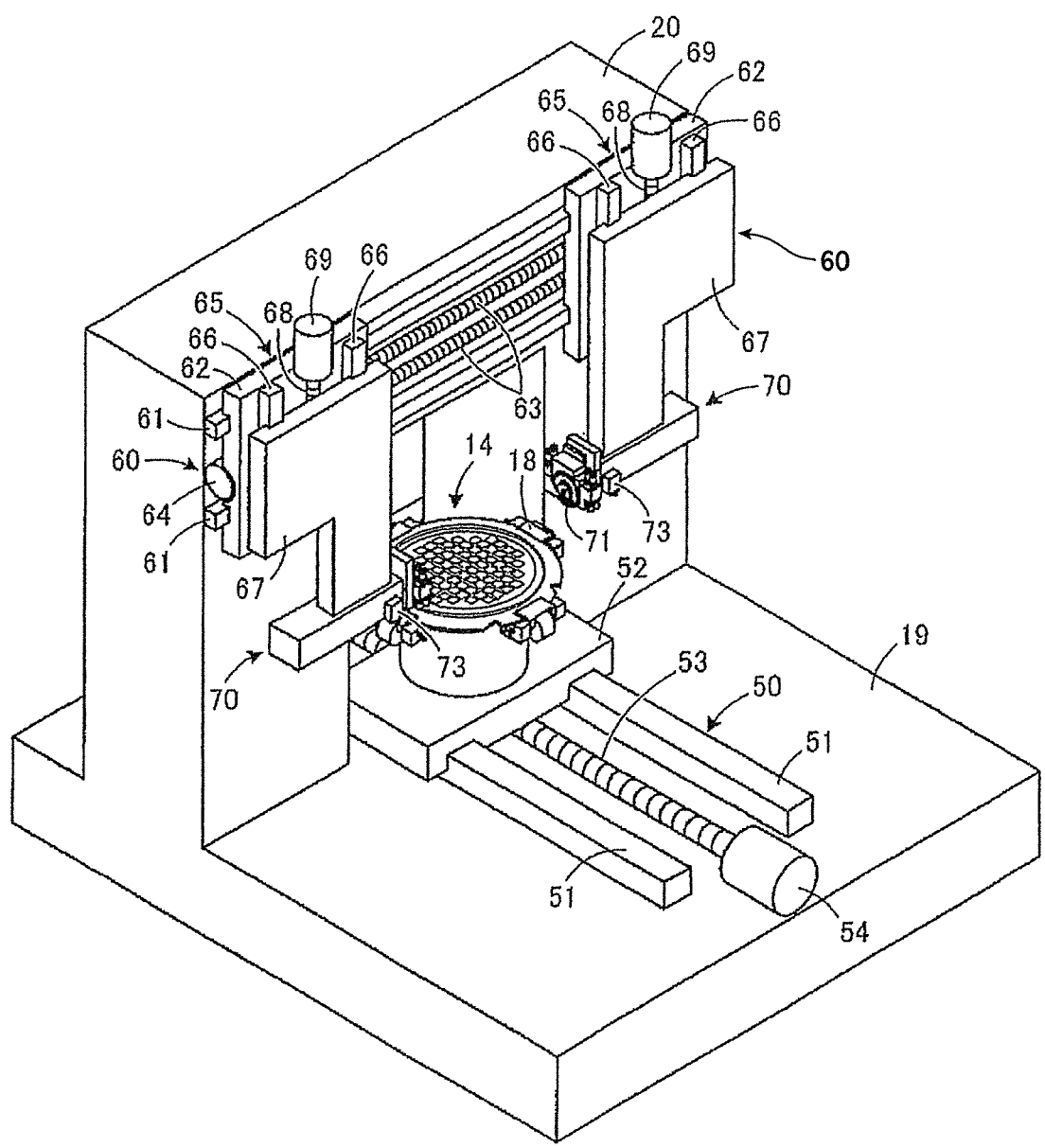
FIG. 2 is a perspective view depicting an internal structure of the cutting apparatus depicted in FIG. 1.
Figure 3:
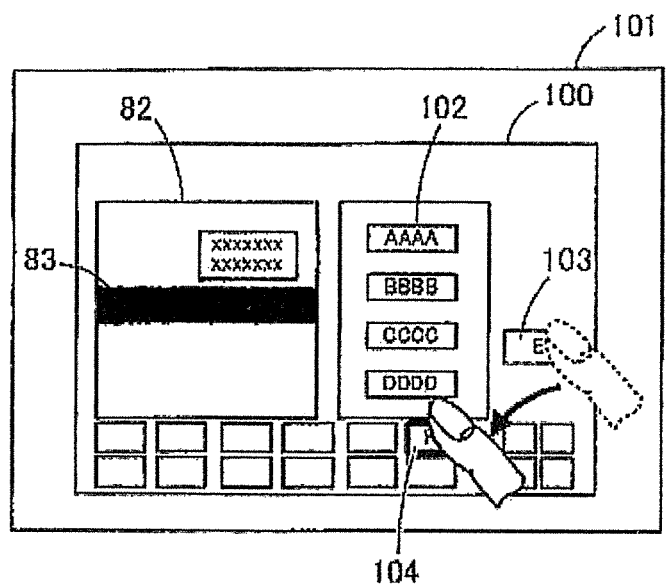
FIG. 3 is an elevational view for illustrating the inspection for a cut groove in the prior art as a comparison.

There will now be described a cutting apparatus according to a preferred embodiment of the present invention with reference to the attached drawings. FIG. 1 is a perspective view depicting an outward appearance of the cutting apparatus according to this preferred embodiment. FIG. 2 is a perspective view depicting an internal structure of the cutting apparatus depicted in FIG. 1. FIG. 3 is an elevational view for illustrating the inspection for a cut groove in the prior art as a comparison. In this preferred embodiment, the cutting apparatus is illustrated as an example of the processing apparatus according to the present invention. However, the processing apparatus according to the present invention is not limited to such a cutting apparatus, provided that kerf inspection can be performed.

Referring to FIG. 1, the cutting apparatus 1 is provided with a touch panel 75 for receiving an input operation by an operator. Various processing conditions are set on the touch panel 75. On the basis of the processing conditions set on the touch panel 75, a cutting blade 71 (see FIG. 2) and a workpiece W held on a chuck table 14 are relatively moved to thereby cut the workpiece W on the chuck table 14 along each division line with the cutting blade 71. The front side of the workpiece W is partitioned by a plurality of division lines to define a plurality of separate regions where a plurality of devices are individually formed.

A dicing tape T is attached at its central portion to the back side of the workpiece W, and a ring frame F is attached to a peripheral portion of the dicing tape T. Accordingly, the workpiece W is supported through the dicing tape T to the ring frame F so as to be surrounded by the ring frame F. The workpiece W thus supported through the dicing tape T to the ring frame F is loaded to the cutting apparatus 1. The workpiece W may be any object that can be processed by the cutting apparatus 1. For example, the workpiece W may be a semiconductor wafer or an optical device wafer on which devices are previously formed. Further, the dicing tape T may be not only a usual adhesive tape composed of a base sheet and an adhesive layer formed on the base sheet, but also a die attach film (DAF) tape composed of a base sheet and a DAF attached to the base sheet.

The cutting apparatus 1 has a boxlike housing 10 for covering a processing space where cutting is performed and a support bed 13 adjacent to the housing 10 and having a standby space and a cleaning space formed on the support bed 13. The upper surface of the support bed 13 is cut at its central portion to form a rectangular opening extending toward the inside of the housing 10. This rectangular opening is covered with a moving plate 15 and a bellows-shaped waterproof cover 16, and the moving plate 15 is movable with the chuck table 14. There is provided below the waterproof cover 16 an X moving mechanism (see FIG. 2) for moving the chuck table 14 in an X direction depicted by an arrow X in FIG. 1. FIG. 1 depicts a condition where the chuck table 14 has been moved to the outside of the housing 10 and positioned in the standby space formed on the support bed 13.

The chuck table 14 has a holding surface 17 for holding the workpiece W. The housing surface 17 is formed of a porous ceramic material. The workpiece W is adapted to be held on the housing surface 17 under suction due to a vacuum applied to the holding surface 17. Four air-driven clamps 18 are provided at equal intervals around the chuck table 14, so as to hold the ring frame F surrounding the workpiece W. The upper and lower surfaces of the ring frame F are adapted to be nipped by each clamp 18. A pair of centering guides 21 are provided above the chuck table 14. The centering guides 21 extend in a Y direction depicted by an arrow Y in FIG. 1. The centering guides 21 are adapted to be moved toward and away from each other in the X direction, thereby positioning the workpiece W in the X direction with respect to the chuck table 14.

An elevator unit 22 for vertically movably mounting a cassette (not depicted) is provided on the support bed 13 adjacent to the chuck table 14 on the front side in the Y direction. The elevator unit 22 has a stage 23 for placing the cassette thereon. When the stage 23 is vertically moved, the height of a desired one of the workpieces W stored in the cassette placed on the stage 23 is adjusted. That is, by raising or lowering the stage 23, the load/unload position of the cassette where the workpiece W is pulled out of the cassette before processing and then loaded to the chuck table 14 or the workpiece W is unloaded from the chuck table 14 after processing and then pushed into the cassette. The housing 10 has a side surface 11, and a push-pull arm 24 is provided on the side surface 11 of the housing 10. The push-pull arm 24 functions to push the workpiece W into the cassette or pull the workpiece W out of the cassette in the condition where the ring frame F is guided by the pair of centering guides 21. Further, a first arm 31 and a second arm 41 are also provided on the side surface 11 of the housing 10. The first arm 31 functions to transfer the workpiece W from the chuck table 14 to a spinner table 20 for use in cleaning the workpiece W after processing. The second arm 41 functions to transfer the workpiece W from the spinner table 20 to the chuck table 14 after cleaning.

The push-pull arm 24 is driven by a horizontal moving mechanism 25 provided on the side surface 11 of the housing 10. The horizontal moving mechanism 25 has a pair of parallel guide rails 26 provided on the side surface 11 of the housing 10 so as to extend in the Y direction and a motor-driven slider 27 slidably mounted on the pair of guide rails 26. A nut portion (not depicted) is formed on the back side (opposed to the side surface 11) of the slider 27, and a ball screw 28 is threadedly engaged with this nut portion. A drive motor 29 is connected to one end of the ball screw 28. When the drive motor 29 is operated, the ball screw 28 is rotated to move the slider 27 along the pair of guide rails 26. Thus, the push-pull arm 24 performs a push-pull operation so as to be moved along the pair of guide rails 26 in the Y direction.

The first arm 31 is driven by a horizontal moving mechanism 32 provided on the side surface 11 of the housing 10. Similarly, the second arm 41 is driven by a horizontal moving mechanism 42 provided on the side surface 11 of the housing 10. The horizontal moving mechanism 32 for driving the first arm 31 has a pair of parallel guide rails 33 provided on the side surface 11 of the housing 10 so as to extend in the Y direction and a motor-driven slider 34 slidably mounted on the pair of guide rails 33. Similarly, the horizontal moving mechanism 42 for driving the second arm 41 has a pair of parallel guide rails 43 provided on the side surface 11 of the housing 10 so as to extend in the Y direction and a motor-driven slider 44 slidably mounted on the pair of guide rails 43. A nut portion (not depicted) is formed on the back side (opposed to the side surface 11) of the slider 34, and a ball screw 35 is threadedly engaged with this nut portion. Similarly, a nut portion (not depicted) is formed on the back side (opposed to the side surface 11) of the slider 44, and a ball screw 45 is threadedly engaged with this nut portion. A drive motor 36 is connected to one end of the ball screw 35. Similarly, a drive motor 46 is connected to one end of the ball screw 45. When the drive motor 36 is operated, the ball screw 35 is rotated to move the slider 34 along the pair of guide rails 33. Thus, the first arm 31 can be moved along the pair of guide rails 33 in the Y direction. Similarly, when the drive motor 46 is operated, the ball screw 45 is rotated to move the slider 44 along the pair of guide rails 43. Thus, the second arm 41 can be moved along the pair of guide rails 43 in the Y direction.

As depicted in FIG. 2, reference numeral 19 denotes a base provided in the housing 10 and the support bed 13 (see FIG. 1). The X moving mechanism 50 for moving the chuck table 14 in the X direction is provided on the base 19. The X moving mechanism 50 has a pair of parallel guide rails 51 provided on the base 19 so as to extend in the X direction and a motor-driven X table 52 slidably mounted on the pair of guide rails 51. A nut portion (not depicted) is formed on the back side (lower surface) of the X table 52, and a ball screw 53 is threadedly engaged with this nut portion. A drive motor 54 is connected to one end of the ball screw 53. When the drive motor 54 is operated, the ball screw 53 is rotated to move the X table 52 along the pair of guide rails 51. The chuck table 14 is fixed to the upper surface of the X table 52. Accordingly, the chuck table 14 can be moved along the pair of guide rails 51 in the X direction.

A double column type support frame 20 is provided on the upper surface of the base 19 so as to straddle the path of movement of the chuck table 14. There are provided on the support frame 20 a pair of Y moving mechanisms 60 for moving a pair of cutting units (processing units) 70 in the Y direction, respectively, and a pair of Z moving mechanisms 65 for moving the pair of cutting units 70 in the Z direction depicted by an arrow Z in FIG. 2, respectively. Each Y moving mechanism 60 has a pair of parallel guide rails 61 provided on the front surface of the support frame 20 so as to extend in the Y direction and a Y table 62 slidably mounted on the pair of guide rails 61. Similarly, each Z moving mechanism 65 has a pair of parallel guide rails 66 provided on the Y table 62 so as to extend in the Z direction and a Z table 67 slidably mounted on the pair of guide rails 66.

The cutting unit 70 for forming a cut groove (kerf) on the workpiece W is provided at the lower end of each Z table 67. A nut portion (not depicted) is formed on the back side of each Y table 62, and a nut portion (not depicted) is also formed on the back side of each Z table 67. A ball screw 63 is threadedly engaged with the nut portion of each Y table 62, and a ball screw 68 is also threadedly engaged with the nut portion of each Z table 67. A drive motor 64 is connected to one end of the ball screw 63 for each Y table 62, and a drive motor 69 is connected to one end of the ball screw 68 for each Z table 67. Accordingly, by operating the drive motor 64 to rotate the ball screw 63, each cutting unit 70 can be moved along the guide rails 61 in the Y direction. Further, by operating the drive motor 69 to rotate the ball screw 68, each cutting unit 70 can be moved along the guide rails 66 in the Z direction.

Each cutting unit 70 includes a spindle case, a spindle rotatably supported to the spindle case, and a cutting blade 71 mounted on the front end of the spindle. The cutting blade 71 functions to cut the workpiece W held on the chuck table 14. The cutting blade 71 is a disk-shaped member formed by binding diamond abrasive grains with a bond. Further, imaging means 73 for detecting a target area of the workpiece W to be processed is provided on the spindle case of each cutting unit 70. Referring back to FIG. 1, the housing 10 has a front surface 12, and the touch panel 75 for displaying various kinds of information is provided on the front surface 12 of the housing 10. Displayed on the touch panel 75 are an image of a cut groove detected by the imaging means 73 and the items of various inspection conditions for the cut groove.

As depicted in FIG. 3, reference numeral 101 denotes a conventional touch panel for use in a cutting apparatus. The touch panel 101 has an inspection screen 100 for displaying a detected image 82 of a cut groove 83. Further, an input area 102 for various inspection conditions is provided on the inspection screen 100, in which a parameter including a light quantity of the imaging means 72 (see FIG. 2) is input in the input area 102. Further, this parameter input is reflected in the cutting apparatus by the touch of an operator's finger on an ENTER button 103 provided on the inspection screen 100. Further, when an OK button 104 provided on the inspection screen 100 is touched by the finger, the cut groove 83 formed on the workpiece W is imaged by the imaging means 73, and various processing defects such as chipping, meandering, and position shift are inspected for the cut groove 83. In performing the inspection for the cut groove 83 (kerf inspection), various adjustment items for the parameter must be considered. In particular, the parameter including a light quantity and an imaging position must be finely adjusted according to the surface condition of the workpiece W or a test element group (TEG).

Accordingly, every time the parameter is changed in the input area 102, the inspection conditions must be set by touching the ENTER button 103, and the kerf inspection must be executed by touching the OK button 104. As described above, many adjustment items for the parameter must be considered in performing the kerf inspection, and the change of the parameter is repeated to thereby find out any optimum inspection conditions, so that much time is required for the optimization of the inspection conditions. Further, every time the parameter is changed, the inspection conditions must be set, so that quick response to such a change in the inspection conditions cannot be supported on the computer side in the cutting apparatus. Further, since the operator must touch the ENTER button 103 and the OK button 104, the operation of selecting the inspection conditions is troublesome and the kerf inspection cannot be smoothly performed.

To the contrary, this preferred embodiment is improved in that after inputting the parameter in the input area, an input cursor is moved from the input area and at the same time the kerf inspection is executed. With this configuration, the kerf inspection can be simulated before setting the inspection conditions, and the optimum inspection conditions can be found out in a short time by repeating this simulation of the kerf inspection. Further, in this simulation, it is unnecessary to set the inspection conditions. Accordingly, frequent changes of the inspection conditions are allowed on the computer side, and the kerf inspection can be smoothly performed without the need for setting of the inspection conditions, thereby reducing the work load on the operator.

Figure 4:
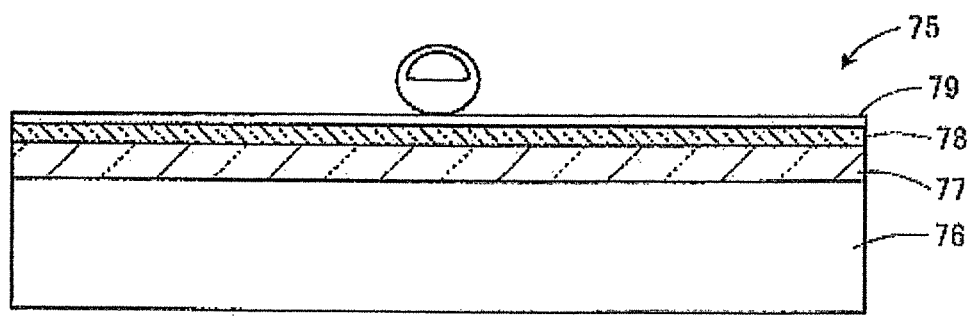
FIG. 4 is a schematic sectional view of a touch panel in this preferred embodiment.

There will now be described the control configuration of the inspection operation in this preferred embodiment with reference to FIGS. 4 and 5. FIG. 4 is a schematic sectional view of the touch panel 75 in this preferred embodiment, and FIG. 5 is a block diagram depicting the inspection operation according to this preferred embodiment.

As depicted in FIG. 4, the touch panel 75 is a so-called capacitive touch panel, which includes a liquid crystal panel 76, a glass substrate 77 formed on the liquid crystal panel 76, a transparent electrode film 78 formed on the glass substrate 77, and a protective film 79 formed on the transparent electrode film 78. The liquid crystal panel 76 has a setting screen, and various kinds of information can be input in the setting screen by touching the upper surface of the touch panel 75 with an operator's finger. In this case, electrodes (not depicted) are provided at the four corners of the glass substrate 77, and a voltage is applied to each electrode to previously generate a uniform electric field over the touch panel 75. When the upper surface of the touch panel 75 is touched by the finger, an electrostatic capacitance is changed at the touch position to thereby detect the coordinates of the touch position.

Figure 5:
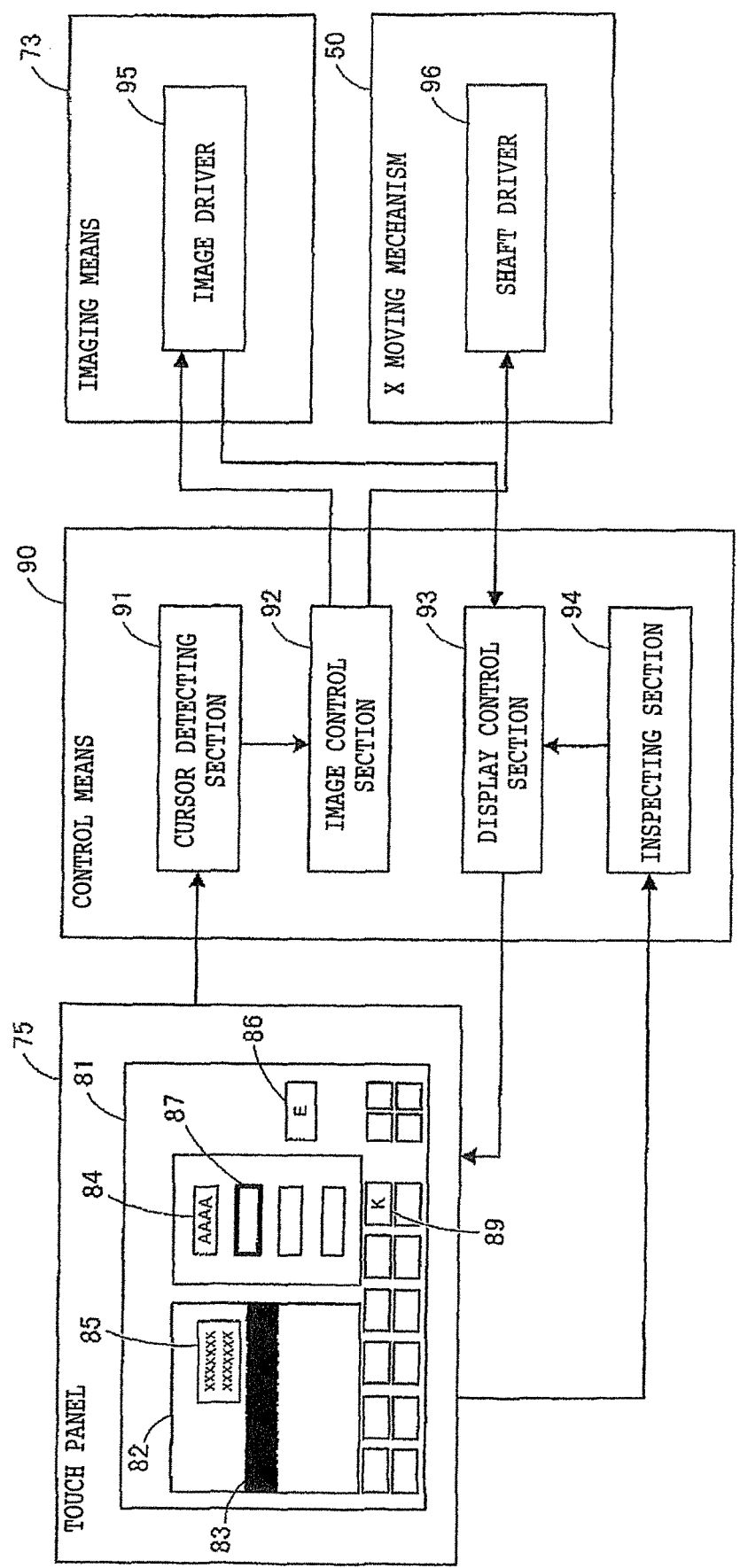
FIG. 5 is a block diagram depicting the inspection operation according to this preferred embodiment.

As depicted in FIG. 5, the touch panel 75 has an inspection screen 81 for receiving an input of a parameter for inspection conditions. A detected image 82 of a cut groove 83 is displayed on the inspection screen 81, and an input area 84 for inputting the parameter for the inspection conditions is provided adjacent to the detected image 82. The detected image 82 includes an actual image of the cut groove 83 formed on the workpiece W and also includes a result display area 85 for displaying the inspection result including the width of the cut groove 83 and the chipping size on the cut groove 83. The parameter for the inspection conditions includes a light quantity and imaging position of the imaging means 73, for example. Further, an ENTER button 86 for setting the parameter for the inspection conditions is displayed on the inspection screen 81.

Connected to the touch panel 75 is control means 90 for controlling the inspection operation for kerf inspection according to the panel operation by the operator. The control means 90 includes a cursor detecting section 91 for detecting the movement of an input cursor 87 and an image control section 92 for controlling an image driver 95 for the imaging means 73 (see FIG. 2) and a shaft driver 96 for the X moving mechanism 50 (see FIG. 2). The control means 90 further includes a display control section 93 for displaying the detected image 82 obtained by the imaging means 73 on the touch panel 75 and an inspecting section 94 for performing the kerf inspection according to the detected image 82 displayed on the touch panel 75.

The cursor detecting section 91 detects the input cursor 87 moving from the input area 84. The input cursor 87 is configured by a rectangular outline formed along the periphery of the input area 84. The input cursor 87 is displayed so as to be superimposed on the periphery of the input area 84. When the input cursor 87 is operated by the operator's finger so as to be put on the input area 84 displayed on the touch panel 75, an input of the parameter into the input area 84 is allowed. After inputting the parameter into the input area 84, the input cursor 87 is moved by the operator's finger from the input area 84. At this time, the movement of the input cursor 87 is detected by the cursor detecting section 91, and a signal indicating this movement of the input cursor 87 is output from the cursor detecting section 91 to the image control section 92.

When the image control section 92 receives this signal indicating the movement of the input cursor 87 as a trigger, the image control section 92 controls the imaging means 73 to image the cut groove 83 according to the parameter input in the input area 84. For example, when a light quantity is input in the input area 84, an adjustment command for the light quantity is output from the image control section 92 to the image driver 95. Further, when an imaging position is input in the input area 84, a movement command for the imaging position is output from the image control section 92 to the shaft driver 96. Then, the image driver 95 adjusts the light quantity of the imaging means 73 according to this adjustment command, and the shaft driver 96 drives the X moving mechanism 50 according to this movement command to thereby relatively move the imaging means 73 and the chuck table 14 in the X direction, thus changing the imaging position.

After completing the adjustment of the light quantity of the imaging means 73 and the movement of the chuck table 14, a completion signal is sent from the image driver 95 and the shaft driver 96 to the image control section 92. After the completion signal is received by the image control section 92, the image control section 92 controls the image driver 95 and operates the imaging means 73 to image the cut groove 83 formed on the workpiece W. Accordingly, the cut groove 83 formed on the workpiece W is imaged according to the parameter input in the input area 84 displayed on the inspection screen 81, that is, with the light quantity suitable for the surface condition of the workpiece W and at the imaging position where a TEG is taken into consideration. After the cut groove 83 is imaged by the imaging means 73, image data is output from the imaging means 73 to the display control section 93.

The display control section 93 forms the detected image 82 from the image data input from the imaging means 73 and then displays the detected image 82 on the inspection screen 81 of the touch panel 75. The inspecting section 94 performs various kinds of image processing to the detected image 82, thereby performing the kerf inspection on the width of the cut groove 83, the chipping size of the cut groove 83, etc. The result of this kerf inspection is output from the inspecting section 94 to the display control section 93, and the result display area 85 depicting the result of the kerf inspection is displayed on the detected image 82 by the display control section 93. With this configuration, the kerf inspection can be performed by operating the imaging means 73 to image the cut groove 83 after suspending the cutting operation of cutting the workpiece W to form the cut groove 83 by using the cutting unit 70.

All of the cursor detecting section 91, the image control section 92, the display control section 93, and the inspecting section 94 of the control means 90 are configured by a processor, storage media, etc., for execution of various kinds of computation. Examples of the storage media include a read only memory (ROM), a random access memory (RAM), and a hard disk drive (HDD). One or more of these storage media is selected according to uses. The storage media previously stores a program for image control, a program for display control, and various parameters for inspection conditions. Further, the control means 90 may be dedicated to the touch panel 75 separately from the control of the cutting apparatus 1 as a whole.

Further, the kerf inspection to be triggered by the cursor movement is a simulation before fixing of the inspection conditions. That is, until the ENTER button 86 is touched by the finger, the inspection conditions are not fixed. More specifically, at the time the input cursor 87 is moved from the input area 84, the parameter input in the input area 84 is temporarily stored into the RAM. Then, the kerf inspection is simulated by using the parameter read from the RAM. Accordingly, even when the parameter is frequently changed to repeat the kerf inspection, the parameter changed can be quickly written to the RAM.

Figure 6A:
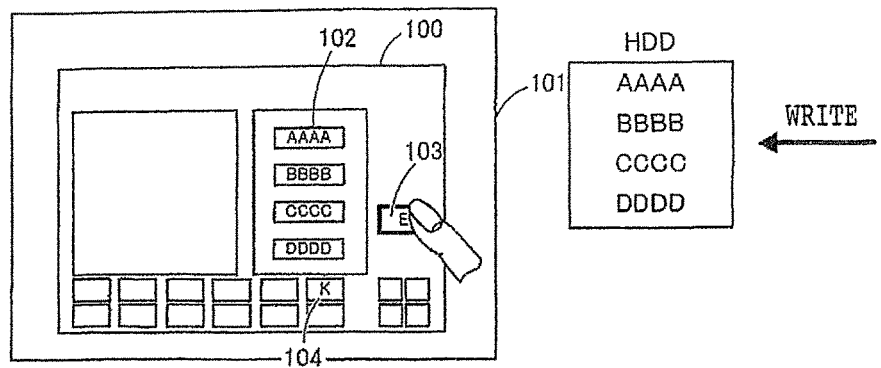
FIGS. 6A to 6D are elevational views of the touch panel for illustrating the inspection operation for kerf inspection.
Figure 6B:
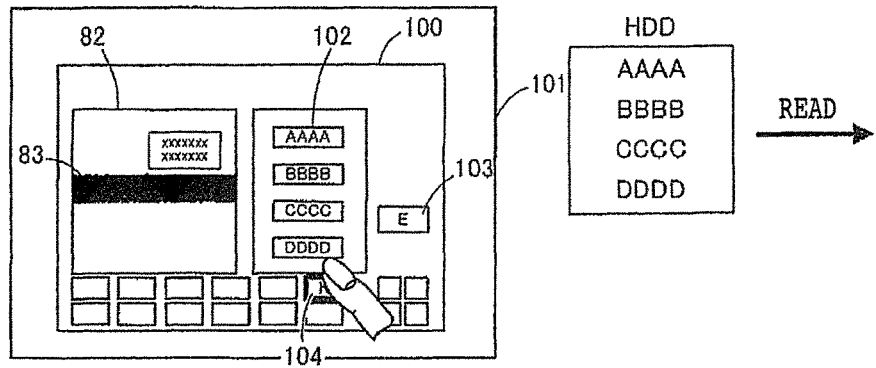
Figure 6C:
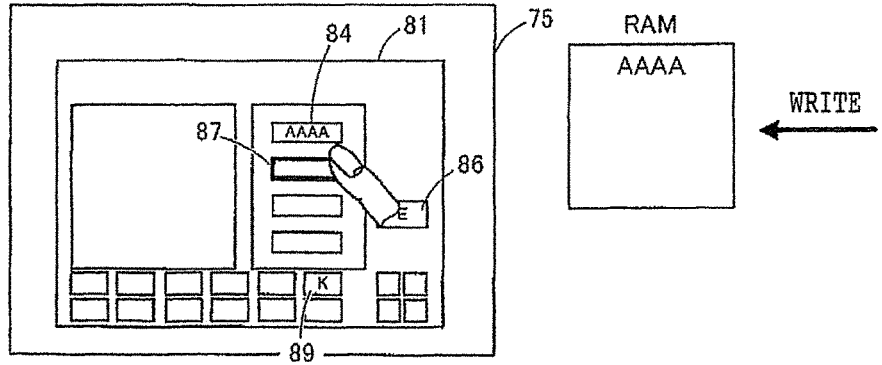
Figure 6D:
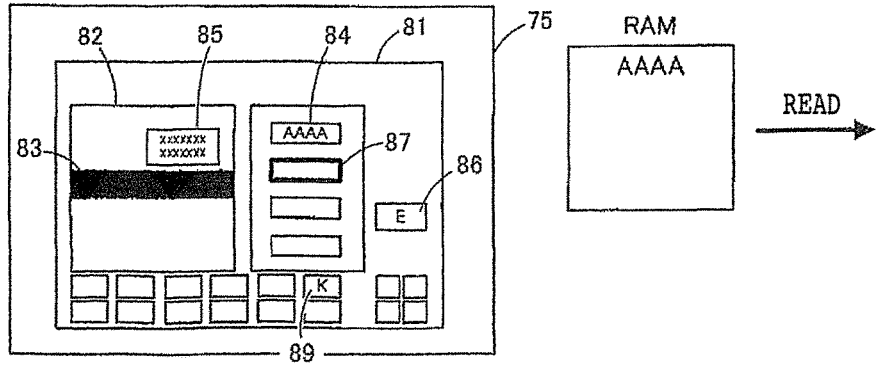

The inspection operation for the kerf inspection will now be described with reference to FIGS. 6A to 6D. FIGS. 6A and 6B depict the inspection operation for the kerf inspection in the prior art as a comparison, and FIGS. 6C and 6D depict the inspection operation for the kerf inspection according to this preferred embodiment. The comparison depicted in FIGS. 6A and 6B depicts the inspection operation for general kerf inspection. Further, the reference numerals depicted in FIG. 5 are used in FIGS. 6C and 6D for the convenience of illustration.

As depicted in FIG. 6A, the parameter for the inspection conditions is input in the input area 102 of the inspection screen 100, and the ENTER button 103 is touched by the finger to thereby fix (set) the inspection conditions. At this time, the parameter input in the input area 102 is written into the HDD by the touch of the ENTER button 103. Thereafter, as depicted in FIG. 6B, the OK button 104 is touched by the finger to thereby read the parameter from the HDD and then perform the imaging of the cut groove 83 according to the inspection conditions fixed above. At this time, the detected image 82 is displayed on the inspection screen 100 to perform the kerf inspection. In the case that the kerf inspection is repeated, the inspection conditions must be set every time the parameter is changed.

In this manner, a three-step operation including the input into the input area 102 by the operator, the touch of the ENTER button 103, and the touch of the OK button 104 is required in performing the kerf inspection in the prior art. Accordingly, the above three-step operation must be repeated to find out any optimum inspection conditions, resulting in troublesome work for the operator. Further, while the parameter is written into the HDD provided in the cutting apparatus, the time required for writing into the HDD is longer than the time required for writing into the RAM. Accordingly, writing into the HDD is not suitable for the operation of changing the parameter for the inspection conditions and repeating the kerf inspection.

To the contrary, as depicted in FIG. 6C, the parameter for the inspection conditions is input in the input area 84 of the inspection screen 81, and the input cursor 87 is then moved from the input area 84 to temporarily decide the inspection conditions according to this preferred embodiment. At this time, the movement of the input cursor 87 is detected by the cursor detecting section 91, and the parameter input in the input area 84 is written into the RAM simultaneously with this detection. Thereafter, as depicted in FIG. 6D, the parameter is read from the RAM to perform the imaging of the cut groove 83 according to the temporary inspection conditions by the image control section 92. The detected image 82 is displayed on the inspection screen 81 by the display control section 93, and the kerf inspection for the cut groove 83 displayed on the detected image 82 is performed by the inspecting section 94. Even when the kerf inspection is repeated, it is unnecessary to fix the inspection conditions every time the parameter is changed.

In this manner, a two-step operation including the input into the input area 84 by the operator and the movement of the input cursor 87 from the input area 84 is performed in performing the kerf inspection according to this preferred embodiment. Accordingly, in finding out any optimum inspection conditions, a work load on the operator can be reduced as compared with the prior art operation depicted in FIGS. 6A and 6B. Further, since the parameter is written into the RAM provided in the cutting apparatus, the kerf inspection can be repeated by frequently writing the parameter into the RAM to thereby change the parameter. After finding out the optimum inspection conditions, the ENTER button 86 is touched by the finger to thereby fix the kerf inspection conditions. That is, by repeating the kerf inspection to finely adjust the parameter for the inspection conditions, the optimum inspection conditions can be found out.

In the kerf inspection according to this preferred embodiment, the operation of the operator and the operation of the shaft are monitored, and the kerf inspection is performed in the condition where the inspection conditions are not fixed after changing the parameter. Accordingly, the load of computing and the time for computing tend to increase. In particular, when a plurality of parameters are continuously changed, a plurality of times of kerf inspection are required. However, the kerf inspection in this preferred embodiment is performed in the condition where the cutting apparatus 1 (see FIG. 1) is stopped in operation (the cutting operation is suspended), that is, the processor is under low load. Accordingly, other operations are not affected during the kerf inspection. That is, the kerf inspection can be performed by effectively using the resources in the suspended condition of the cutting apparatus 1.

As described above, the cutting apparatus 1 according to this preferred embodiment can exhibit the following effects. When the parameter is input into the input area 84 and the input cursor 87 is moved from the input area 84, the kerf inspection for the cut groove 83 is triggered. That is, the kerf inspection for the cut groove 83 is automatically started without the need for instruction from the operator. That is, it is unnecessary for the operator to instruct the kerf inspection every time the parameter is input. Accordingly, the operation of selecting the parameter for the inspection conditions can be smoothly performed and the inspection conditions can be optimized in a short time.

While the touch panel 75 in this preferred embodiment is a capacitive (surface type capacitive) touch panel, the configuration of the touch panel in the present invention is not limited, but various types of touch panels capable of displaying an operation screen for the cutting unit may be used. Examples of the touch panel usable in the present invention include a resistive touch panel, projection type capacitive touch panel, ultrasonic surface acoustic wave type touch panel, optical touch panel, and electromagnetic induction type touch panel.

While a cutting apparatus for cutting a workpiece is used as a processing apparatus in this preferred embodiment, the configuration of the processing apparatus in the present invention is not limited, but the present invention is also applicable to any other processing apparatuses capable of performing the kerf inspection. For example, the processing apparatus usable in the present invention may be a cutting apparatus, laser processing apparatus, edge trimming apparatus, and cluster apparatus including these apparatuses.

Accordingly, while a cutting unit is used as a processing unit in this preferred embodiment, the configuration of the processing unit in the present invention is not limited, but various kinds of processing units capable of forming a processed groove on a workpiece held on a chuck table may be used. For example, a laser processing unit may be used in a laser processing apparatus.

Further, examples of the workpiece usable in the present invention include a semiconductor substrate, inorganic material substrate, and package substrate. The semiconductor substrate may be formed of silicon, gallium arsenide, gallium nitride, or silicon carbide, for example. The inorganic material substrate may be formed of sapphire, ceramic, or glass, for example. Devices may be previously formed on the semiconductor substrate and the inorganic material substrate or no devices may be previously formed on these substrates. Further, the package substrate may be various types of package substrates for a chip size package (CSP), a wafer level chip size package (WLCSP), a system in package (SIP), and a fan out wafer level package (FOWLP). The package substrate may be previously formed with a shield against electro magnetic interference (EMI). Further, the workpiece may be a lithium tantalate substrate, lithium niobate substrate, raw ceramic substrate, or piezoelectric substrate. Devices may be previously formed on these substrates or no devices may be previously formed on these substrates.

Further, the above preferred embodiment and various modifications may be combined generally or partially to perform other preferred embodiments.

Further, the present invention is not limited to the above preferred embodiment and modifications mentioned above, but various modifications, replacements, and changes may be made within the scope of the present invention. Further, if the technical idea of the present invention can be realized by any other methods using any technical progress or derivative techniques, the present invention may be embodied by using these methods. Accordingly, the present invention claimed herein is intended to cover all embodiments that may fall within the scope of the present invention.

Further, while the present invention is applied to the kerf inspection for a workpiece in the above preferred embodiment, the present invention is also applicable to the inspection of any processing mark formed on a workpiece.

As described above, the present invention has an effect that the operation of selecting the parameter for the inspection conditions can be easily performed. In particular, the present invention is useful as a processing apparatus for performing the kerf inspection of a processed groove formed on a semiconductor wafer.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A control method for a processing apparatus including a chuck table for holding a workpiece, a processing unit for forming a processed groove on the workpiece held on the chuck table, imaging means for detecting a target area of the workpiece to be processed, and a touch panel for displaying an image detected by the imaging means, the touch panel being capable of receiving an input of a plurality of parameters for various inspection conditions, the control method comprising the steps of:
   suspending a processing operation of the processing unit during the formation of the processed groove and then imaging the processed groove by using the imaging means to obtain the detected image;
   displaying the detected image of the groove on the touch panel;
   inspecting, by a control means, the condition of the processed groove according to the detected image;
   displaying on the touch panel at least one inspection condition item related to the formed groove;
   receiving, by the control means, input of a selected one of the parameters into an input area of the touch panel from an operator for adjusting the parameters to optimize the inspection conditions;
   detecting, by the control means, movement of an input cursor away from the input area;
   in response to detecting movement of the input cursor away from the input area, re-imaging the processed groove by using the imaging means to obtain a detected re-image using the selected parameter input in the input area; and
   displaying the detected re-image of the groove on the touch panel.

2. The control method for a processing apparatus according to claim 1, wherein the plurality of parameters include a light quantity.

3. The control method for a processing apparatus according to claim 1, wherein the plurality of parameters include an imaging position.

4. The control method for a processing apparatus according to claim 1, wherein the workpiece is an optical device wafer.

5. The control method for a processing apparatus according to claim 1, wherein the workpiece is a semiconductor wafer.

6. The control method for a processing apparatus according to claim 5, wherein the inspecting the condition of the processed groove according to the detected image comprises detecting chipping during the formation of the groove and/or meandering of the formed groove.

7. The control method for a processing apparatus according to claim 1, wherein the processing unit is a cutting apparatus.

8. The control method for a processing apparatus according to claim 1, wherein in response to detecting movement of the input cursor away from the input area, the re-imaging of the processed groove is automatically started.

9. The control method for a processing apparatus according to claim 1, further comprising;
   inspecting, by the control means, the condition of the processed groove according to the re-image of the groove; and
   displaying on the touch panel at least one inspection condition item related to the formed groove based on the re-image of the groove.

10. A semiconductor processing system comprising:
    a chuck table for holding and positioning a semiconductor wafer;
    a cutting blade for cutting a groove in the semiconductor wafer;
    an imaging means configured to image the groove cut in the semiconductor wafer and to output associated image data;
    image driver configured to adjust a light quantity of the imaging means according to an adjustment command to adjust a light quantity parameter;
    positioning driver configured to move the chuck table and the imaging means relative to each other according to a movement command to change an imaging position of the wafer based on a positioning parameter;
    a touch panel having a display area and an input area, wherein the input area is configured to receive a light quantity parameter and a positioning parameter;
    control means comprising:
       an image control section configured to cause the image means to image the groove based on the light quantity parameter and the positioning parameter;
       a display control section configured to receive the image data from the imaging means and form a detected image of the groove from the image data, the display control section further causing the detected image of the groove to be displayed on the touch panel;
       an inspecting section configured to perform image processing on the detected image including performing kerf inspection for the groove and to generate at least one result based on the kerf inspection wherein the at least one result is output from the inspecting section to the display control section, and the at least one result is displayed on the touch panel by the display control section; and
       a cursor detecting section for detecting the movement of an input cursor away from the input area of the touch panel wherein the cursor detecting section outputs a cursor movement signal to the image control section when the cursor detecting section detects the movement of the input cursor away from the input area of the touch panel;
       wherein when the image control section receives the cursor movement signal indicating the movement of the input cursor, the cursor movement signal triggers the image control section to cause the imaging means to re-image the groove according to the parameters input in the input area of the touch panel including adjusting the light quantity if the light quantity parameter was changed via input into the input area of the touch panel and/or adjusting the relative positive of the chuck table and the imaging means if the positioning parameter was changed via input into the input area of the touch panel;

wherein the display control section receives the image data from the imaging means and forms a detected re-image of the groove from the image data, the display control section further causing the detected re-image of the groove to be displayed on the touch panel.

11. The semiconductor processing system of claim 10 wherein the inspecting section performs image processing on the detected re-image including performing kerf inspection for the groove and to generate at least one result based on the kerf inspection wherein the at least one result is output from the inspecting section to the display control section, and the at least one result is displayed on the touch panel by the display control section.

12. The semiconductor processing system of claim 11 wherein the kerf inspection for the groove includes determining a width of the groove and determining a chipping size for the groove.

13. The semiconductor processing system of claim 10 wherein the kerf inspection for the groove includes determining a width of the groove and determining a chipping size for the groove.

14. The semiconductor processing system of claim 10 wherein the image control section causes the imaging means to re-image the groove according to the parameters input in the input area of the touch panel without the detection of a selection of an ENTER button.

15. The semiconductor processing system of claim 10 further comprising RAM and wherein light quantity parameter and/or positioning parameter input via the input area of the touch panel is stored in RAM and,
wherein image control section causes the imaging means to re-image the groove according to the parameters input in the input area of the touch panel and stored in RAM.

16. The semiconductor processing system of claim 15 wherein the wherein image control section causes the imaging means to re-image the groove according to the parameters input in the input area of the touch panel and stored in RAM without the parameters input in the input area being stored in a hard disk drive prior to the re-image of the groove.

17. The semiconductor processing system of claim 16 further comprising a hard disk drive and wherein the touch panel comprises an ENTER button, and wherein light quantity parameter and/or positioning parameter input via the input area of the touch panel is stored in the hard disk drive upon the detection of the selection of the ENTER button.

* * * * *